United States Patent
Roy et al.

(10) Patent No.: US 12,191,460 B2
(45) Date of Patent: Jan. 7, 2025

(54) ASYMMETRIC BATTERY PACK WITH VARIED ELECTRODE AND CURRENT COLLECTOR PROPERTIES TO ACHIEVE C-RATE BALANCING

(71) Applicant: Apple Inc., Cupertino, CA (US)

(72) Inventors: Loren L. Roy, Los Gatos, CA (US); Qingzhi Guo, Campbell, CA (US); Premanand Ramadass, San Mateo, CA (US); Hyungook Yoon, Santa Clara, CA (US); Jinjun Shi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 17/744,002

(22) Filed: May 13, 2022

(65) Prior Publication Data
US 2022/0399576 A1 Dec. 15, 2022

Related U.S. Application Data

(62) Division of application No. 16/739,457, filed on Jan. 10, 2020, now Pat. No. 11,489,211.
(Continued)

(51) Int. Cl.
*H01M 10/44* (2006.01)
*H01M 4/70* (2006.01)
(Continued)

(52) U.S. Cl.
CPC ........... *H01M 10/441* (2013.01); *H01M 4/70* (2013.01); *H01M 10/0431* (2013.01);
(Continued)

(58) Field of Classification Search
CPC ............. H01M 10/441; H01M 10/446; H01M 10/448; H01M 10/0431; H01M 10/0468;
(Continued)

(56) References Cited

U.S. PATENT DOCUMENTS 6,558,438 B1 5/2003 Satoh et al.
8,142,928 B2 3/2012 Blomgren et al.
(Continued)

FOREIGN PATENT DOCUMENTS

CN 101267037 A 9/2008
CN 103035959 A 4/2013
JP H11-144764 A 5/1999

OTHER PUBLICATIONS

Gogoana et al., "Internal resistance matching for parallel-connected lithium-ion cells and impacts on battery pack cycle life," Journal of Power Sources, 252, (2014), p. 8-13.
(Continued)

*Primary Examiner* — Raymond Alejandro
(74) *Attorney, Agent, or Firm* — BakerHostetler

(57) ABSTRACT

Battery packs having jelly roll battery cells of different designs or capacities may have an imbalance in the charging and/or discharging current supplied to and provided by each jelly roll due to differences in capacity specific impedance between the battery cells of the battery pack. A C-rate (i.e., current relative to rated capacity) of a first and second battery cell connected in parallel may be balanced by altering properties of an active layer and/or a thickness of a current collector of the second battery cell to reduce an impedance of the second battery cell.

10 Claims, 5 Drawing Sheets

Related U.S. Application Data

(60) Provisional application No. 62/864,085, filed on Jun. 20, 2019.

(51) Int. Cl.
*H01M 10/04* (2006.01)
*H01M 10/0587* (2010.01)
*H01M 10/42* (2006.01)
*H01M 50/103* (2021.01)
*H01M 50/112* (2021.01)
*H01M 50/538* (2021.01)
*H01M 50/534* (2021.01)

(52) U.S. Cl.
CPC ... *H01M 10/0587* (2013.01); *H01M 10/4207* (2013.01); *H01M 50/103* (2021.01); *H01M 50/112* (2021.01); *H01M 50/538* (2021.01); *H01M 2010/4292* (2013.01); *H01M 50/534* (2021.01)

(58) Field of Classification Search
CPC ......... H01M 10/0587; H01M 10/4207; H01M 10/0481; H01M 50/538; H01M 50/534; H01M 50/103; H01M 50/112; H01M 4/70; H01M 4/72; H01M 4/665; H01M 2010/4292

See application file for complete search history.

(56) References Cited

U.S. PATENT DOCUMENTS

| | | | |
|---|---|---|---|
| 8,738,309 B2 | 5/2014 | Bertness | |
| 9,300,004 B2 | 3/2016 | Barone et al. | |
| 9,459,667 B2 | 10/2016 | Yebka et al. | |
| 2009/0176147 A1* | 7/2009 | Hatanaka | H01M 4/70 429/142 |
| 2012/0015223 A1 | 1/2012 | Bhardwaj et al. | |

OTHER PUBLICATIONS

Brand et al., "Current distribution within parallel-connected battery cells," Journal of Power Sources, 334, (2016), p. 202-212.

* cited by examiner

ASYMMETRIC BATTERY PACK WITH VARIED ELECTRODE AND CURRENT COLLECTOR PROPERTIES TO ACHIEVE C-RATE BALANCING

PRIORITY

This application is a Divisional of patent application Ser. No. 16/739,457, filed Jan. 10, 2020, now U.S. Pat. No. 11,489,211 issued Nov. 1, 2022, which claims the benefit under 35 U.S.C. § 119 (e) of U.S. Provisional Patent Application Ser. No. 62/864,085, entitled "ASYMMETRIC BATTERY PACK WITH VARIED ELECTRODE AND CURRENT COLLECTOR properties TO ACHIEVE C-RATE BALANCING," filed on Jun. 20, 2019, which is incorporated herein by reference in its entirety.

TECHNICAL FIELD

The present disclosure relates generally to battery cells, and more particularly, to a battery pack having varied electrode and/or current collector properties to achieve C-Rate balancing.

BACKGROUND

A jelly roll battery cell includes wound layers of a cathode and an anode, with tabs extending from each to enable electrical connection to the cathode and anode layers. Jelly rolls having higher capacities typically require longer and/or wider cathode and anode layers compared to jelly rolls with lower capacities. Connecting two or more jelly rolls in parallel where the jelly rolls have differing capacities, may result in an imbalance in the charging and/or discharging current supplied to and provided by each jelly roll. In addition, jelly rolls connected in parallel that each have a differing battery cell design (e.g., differing electrode shape among two or more jelly rolls) but substantially equal capacities, may nonetheless have an imbalance in the charging and/or discharging current supplied to and provided by each jelly roll due to differences in their impedance.

In such instances, it may be desirable to balance a C-Rate (i.e., current relative to rated capacity) of connected battery cells by minimizing the difference in capacity specific impedance ("QSI"). In other words, the charging and discharging current is split in proportion to the respective capacity of each connected battery cell. Specifically, because jelly rolls connected in parallel share the same charge and discharge voltage, a voltage drop of each jelly roll should be made equal, i.e., $\Delta V = I_i Z_i = I_j Z_j \ldots = I_n Z_n$, where "I" is the load or current in amperes and "Z" is impedance. With C-Rate balancing, the QSI of each jelly roll should be made equal, i.e., $QSI = Q_i Z_i = Q_j Z_j \ldots Q_n Z_n$, where "Q" is the capacity and "Z" is impedance. The QSI for a particular jelly roll is a function of electrode length and/or width because the longer and/or wider an electrode, the larger the QSI. Generally speaking, QSI can be considered to be the sum of in-plane (such as current collector resistance) and thru-plane QSI contributions such as charge transfer and electrolyte impedance. Thru-plane QSI is expected to be balanced (equal) between two jelly rolls with same electrode properties such as active layer thickness, but in-plane QSI will vary with current collector length and/or width (among the two, length often affects in-plane QSI much more than width).

SUMMARY

The disclosed embodiments provide for a battery pack that utilizes C-Rate balancing by reducing an impedance of a battery cell to balance a C-Rate of the battery pack. The battery pack includes a first battery cell having a wound set of layers comprising a cathode layer, an anode layer, and a separator layer disposed between the cathode layer and the anode layer. The battery pack also includes a second battery cell connected in parallel with the first battery cell. The second battery cell includes a wound set of layers comprising a cathode layer, an anode layer, and a separator layer disposed between the cathode layer and the anode layer. The cathode layer of the first battery cell has a first active layer coated on a first current collector. The first current collector having a first thickness. The cathode layer of the second battery cell has a second active layer coated on a second current collector. The second current collector having a second thickness that is greater than the first thickness to reduce an impedance of the second battery cell and balance a C-rate of the second battery cell with a C-rate of the first battery cell.

The disclosed embodiments provide for a battery pack that utilizes C-Rate balancing by reducing an impedance of a battery cell to balance a C-Rate of the battery pack. The battery pack includes a first battery cell having a wound set of layers comprising a cathode layer, an anode layer, and a separator layer disposed between the cathode layer and the anode layer. The battery pack also includes a second battery cell connected in parallel with the first battery cell. The second battery cell includes a wound set of layers comprising a cathode layer, an anode layer, and a separator layer disposed between the cathode layer and the anode layer. The anode layer of the first battery cell has a first active layer coated on a first current collector. The first current collector has a first thickness. The anode layer of the second battery cell has a second active layer coated on a second current collector. The second current collector has a second thickness that is greater than the first thickness to reduce an impedance of the second battery cell and balance a C-rate of the second battery cell with a C-rate of the first battery cell.

In some embodiments, a method for balancing a C-rate of an asymmetric battery pack is disclosed. The method includes packaging a first jelly roll battery cell and a second jelly roll battery cell into a battery pack. The method further includes balancing a C-rate of the second jelly roll battery cell with a C-rate of the first jelly roll battery cell by increasing a thickness of a current collector of a cathode layer of the second jelly roll battery cell to reduce an impedance of the second jelly roll battery cell. The method also includes connecting the first jelly roll battery cell and the second jelly roll battery cell in parallel.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
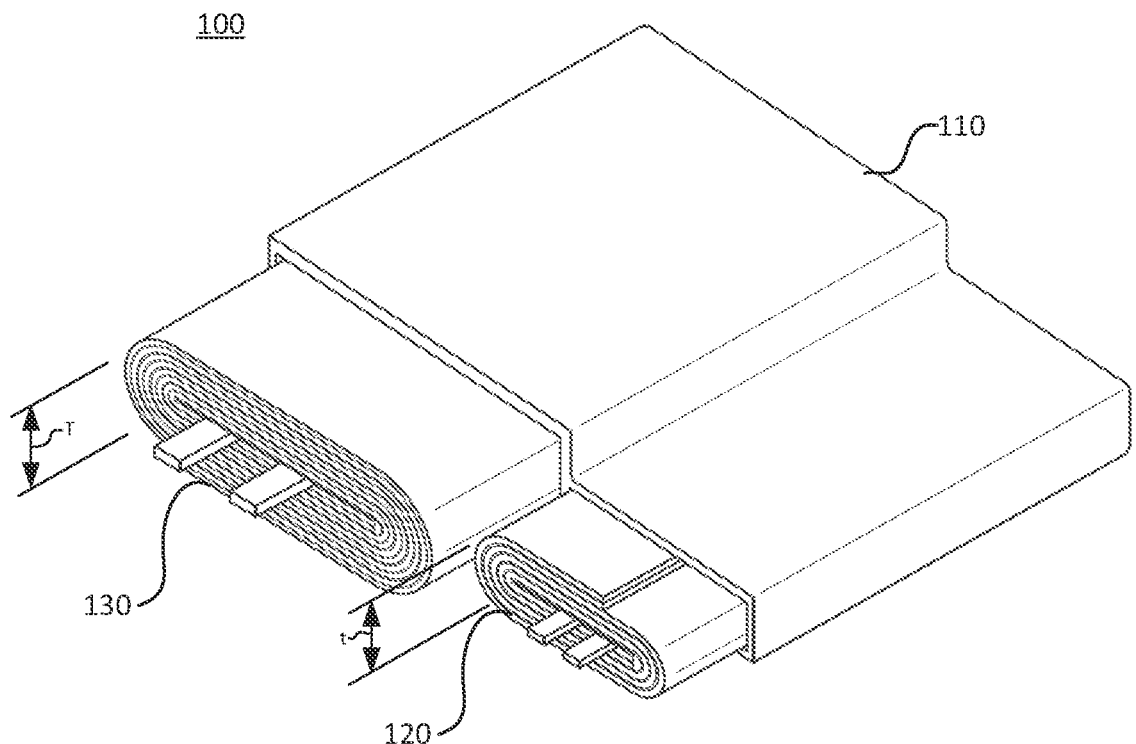
FIG. 1A illustrates a perspective view of a battery pack, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A jelly roll battery cell includes wound layers of a cathode and an anode, with tabs extending from each to enable electrical connection to the cathode and anode layers. Jelly rolls having higher capacities typically require longer and/or wider cathode and anode layers compared to jelly rolls with lower capacities. Connecting two or more jelly rolls in parallel with each jelly roll having a different capacity, may result in the higher capacity jelly roll having an increased in-plane QSI compared to the lower capacity jelly roll due to the increased length and/or width of an active layer disposed on the current collectors of the higher capacity jelly roll. Further, jelly rolls connected in parallel that each have a differing battery cell design (e.g., differing electrode shape among two or more jelly rolls) but substantially equal capacities, may nonetheless have an imbalance in the charging and/or discharging current supplied to and provided by each jelly roll due to differences in their in-plane QSI. Generally, the longer the electrode length, or wider the electrode width, the higher the in-plane QSI. Jelly rolls having a significant difference in capacity and/or QSI that are connected in parallel, may result in an imbalance in the charging and/or discharging current supplied to and provided by each jelly roll. An imbalance may lead to a lower QSI jelly roll consuming a larger proportion of a charging C-Rate of the battery pack. C-Rate or QSI imbalance may lead to a lower QSI jelly roll battery cell to be charged at a higher C-Rate to cause reduced anode potential thereby triggering Li-plating. Moreover, the lower QSI jelly roll battery cell will charge faster and consequently spend more charge time at a high state of charge to cause higher cell impedance growth while waiting for the larger QSI battery cell to be fully charged. The end result is that the lower QSI battery cell will fail sooner. Accordingly, there is a need for certain embodiments of a battery pack having jelly rolls of different capacities, shapes, and/or designs that have the same C-Rate to enable the jelly rolls of the battery pack to split the charging and discharging current in proportion to their respective capacities or impedances to prevent premature failure.

The disclosed technology addresses the foregoing limitations of conventional asymmetric battery packs by balancing a C-Rate of a higher capacity jelly roll with a C-Rate of a lower capacity jelly roll by altering properties of an active layer and/or thickness of a current collector to adjust an impedance or QSI of the jelly rolls to thereby balance a C-Rate of the jelly rolls. The disclosed technology further addresses the foregoing limitations of conventional asymmetric battery packs that comprise battery cells connected in parallel that each have a differing battery cell design (e.g., differing electrode shape among two or more battery cells) but substantially equal capacities, by altering properties of an active layer and/or thickness of a current collector to adjust an impedance of the jelly rolls to thereby balance a C-Rate of the battery cells. C-Rate balancing allows battery cells connected in parallel to be charged and discharged at the same C-Rate. In other words, the charging and discharging current is split in proportion to the respective capacity of each connected battery cell. Specifically, because jelly rolls connected in parallel share the same charge and discharge voltage, a voltage drop of each jelly roll should be made equal. With C-Rate balancing, the QSI of each jelly roll is made equal. The in-plane QSI contribution for a particular jelly roll is a function of electrode length, width or current collector thickness because the longer, wider an electrode or the thinner the current collector, the higher the in-plane QSI. The thru-plane QSI contribution for a particular jelly roll is a function of electrode properties including active layer thickness and density because the thinner or more porous an active layer, the lower the thru-plane QSI due to reduced electrolyte impedance.

Figure 1B:
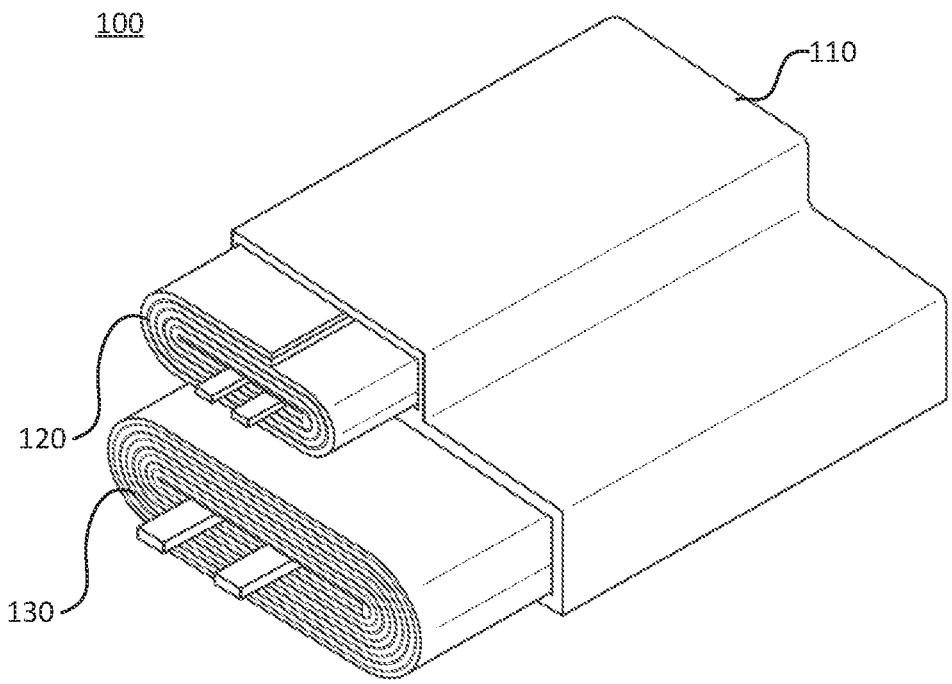
FIG. 1B illustrates a perspective view of a battery pack, in accordance with various aspects of the subject technology.

FIGS. 1A and 1B illustrate perspective views of a battery pack 100, in accordance with various aspects of the subject technology. The battery pack 100 includes a first jelly roll 120 and a second jelly roll 130 connected in parallel, enclosed in an enclosure 110. The first jelly roll 120 may have a lower capacity compared to the second jelly roll 130. As a result, the first jelly roll 120 may be formed of electrodes (e.g., a cathode and an anode layer) that have a length that is less than a length of electrodes of the second jelly roll 130. The first jelly roll 120 may therefore have a smaller width and/or thickness "t" compared to a width and/or thickness "T" of the second jelly roll 130 based on the number of windings in each of the first and second jelly rolls, 120 and 130 respectively. Each of the first and second jelly rolls, 120 and 130 respectively, may have tabs extending from their respective electrodes disposed at an end of the electrodes of each of the first and second jelly rolls, 120 and 130 respectively. Because the first and second jelly rolls, 120 and 130 respectively, have different electrode length and/or width, the QSI of the second jelly roll 130 would have been higher than the QSI of the first jelly roll 120 if not otherwise modified, as discussed further below with reference to FIGS. 3A-3D.

As shown in FIG. 1A, the first and second jelly rolls, 120 and 130 respectively, may be arranged in a side-by-side configuration. Referring to FIG. 1B, the first and second jelly rolls, 120 and 130 respectively, may be arranged in a stacked configuration. Other arrangements and battery pack 100 configurations are contemplated without departing from the scope of the subject technology.

It is also understood that the battery pack 100 may comprise a first battery cell 120 and a second battery cell 130 connected in parallel, each having the same capacity. The second battery cell 130, however, may have a higher impedance than the first battery cell 120 based on a different battery cell design for the second battery cell 130. For example, the second battery cell 130 may have a length that is 2× longer than a length of the first battery cell 120, and the second battery cell 130 may have a width that is ½ narrower than a width of the first battery cell 120. Each of the first and second battery cells, 120 and 130 respectively, may therefore, have a substantially equal surface area (A=L*W) and thus, have a substantially equal capacity, but with an impedance imbalance if not otherwise modified, as discussed further below with reference to FIGS. 3A-3D. In this example, because the second battery cell 130 has a length that substantially greater than the length of the first battery cell 120, the impedance of the second battery cell 130 would have been greater due to larger in-plane impedance than the impedance of the first battery cell 120. It is also understood that the first battery cell 120 and the second battery cell 130 may each comprise a stacked cell connected in parallel and having an impedance imbalance, or one of a stacked cell and a jelly roll cell connected in parallel and having an impedance imbalance, without departing from the scope of the subject technology.

Figure 2A:
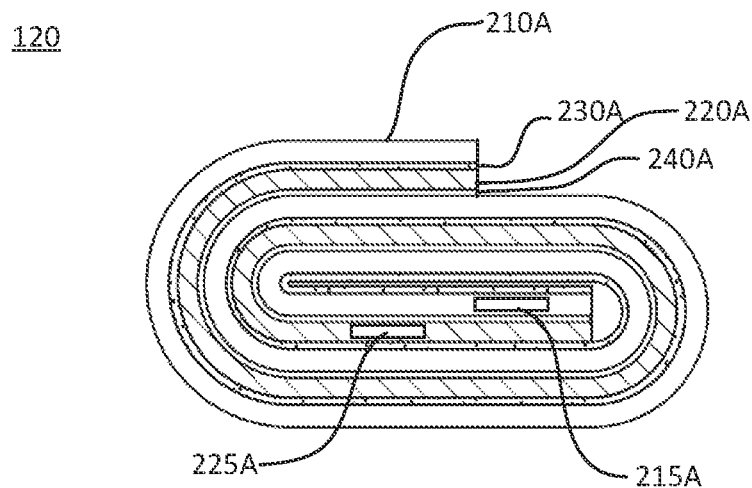
FIG. 2A illustrates a cross-section view of a battery cell, in accordance with various aspects of the subject technology.

FIG. 2A illustrates a cross-section view of the first battery cell 120, in accordance with various aspects of the subject technology. The first battery cell 120 may comprise a wound set of layers comprising a cathode layer 210A, an anode layer 220A, a first separator layer 230A disposed between the cathode layer 210A and the anode layer 220A, and a second separator layer 240A disposed between the anode layer 220A and the cathode layer 210A. Proximate to or at a first end of the cathode layer 210A and the anode layer 220A of the first battery cell 120, a first cathode tab 215A may extend from the cathode layer 210A, and a first anode tab 225A may extend from the anode layer 220A.

Figure 2B:
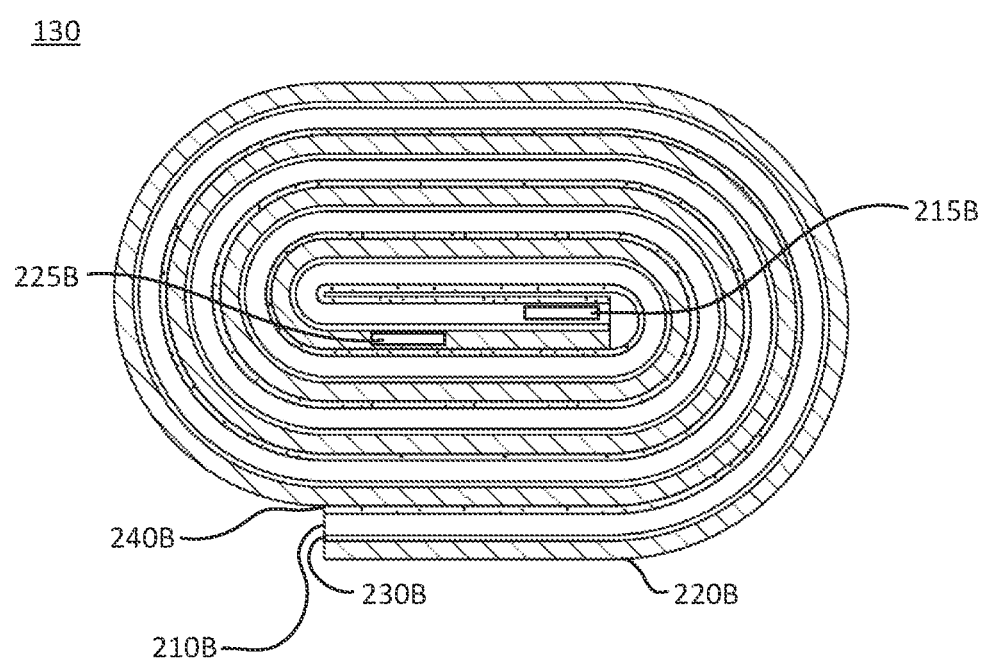
FIG. 2B illustrates a cross-section view of a battery cell, in accordance with various aspects of the subject technology.

FIG. 2B illustrates a cross-section view of the second battery cell 130, in accordance with various aspects of the subject technology. The second battery cell 130 may comprise a wound set of layers comprising a cathode layer 210B, an anode layer 220B, a first separator layer 230B disposed between the cathode layer 210B and the anode layer 220B, and a second separator layer 240B disposed between the anode layer 220B and the cathode layer 210B. The second battery cell 130 further comprises a first cathode tab 215B extending from the cathode layer 210B, and a first anode tab 225B extending from the anode layer 220B.

FIGS. 3A-3D illustrate detailed views of an electrode, in accordance with various aspects of the subject technology. The electrode may comprise the cathode layer 210A,B or the anode layer 220A,B. Each of the cathode layer 210A,B and the anode layer 220A,B may comprise an active layer 310 disposed or coated on a current collector 320. For the cathode layer 210A, B, the active layer 310 may comprise a lithium compound (e.g., $LiCoO_2$, $LiFePO_4$, $Li(NiMnCo)O_2$, $LiMnO_4$, $Li_2FeP_2O_7$). For the anode layer 220A, B, the active layer 310 may comprise carbon or graphite, or other materials such as silicon, lithium titanium oxide, tin, phosphorus, or lithium metal. For the cathode layer 210A, B, the current collector 320 may comprise an aluminum foil. For the anode layer 220A, B, the current collector 320 may comprise a copper foil.

The separator 230A,B and 240A,B may include polyethylene (PE), polypropylene (PP), and/or a combination of PE and PP, such as PE/PP or PP/PE/PP. The wound set of layers are enclosed within the enclosure 110 and immersed in an electrolyte, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

In one aspect, properties of the active layer 310 may be altered to modify an impedance (e.g., thru-plane impedance) of the active layer 310. The properties of the active layer 310 that may be modified include porosity, density, thickness, particle size and size distribution, process orientation, material properties and ratio between active material, conductive additives, and adhesion additives. For example, an impedance of an electrode may be reduced by reducing a thickness of the active layer 310. Conversely, an impedance of an electrode may be increased by increasing a thickness of the active layer 310.

In another aspect, properties of the current collector 320 may be altered to modify an impedance of the current collector 320. The properties of the current collector 320 that may be modified include thickness, surface morphology, roughness, hydrophobicity (water contact angle), or whether there is an additional thin carbon coating layer or not. For example, an impedance of an electrode may be reduced by increasing a thickness of the current collector 320. Conversely, an impedance of an electrode may be increased by reducing a thickness of the current collector 320.

Figure 3A:
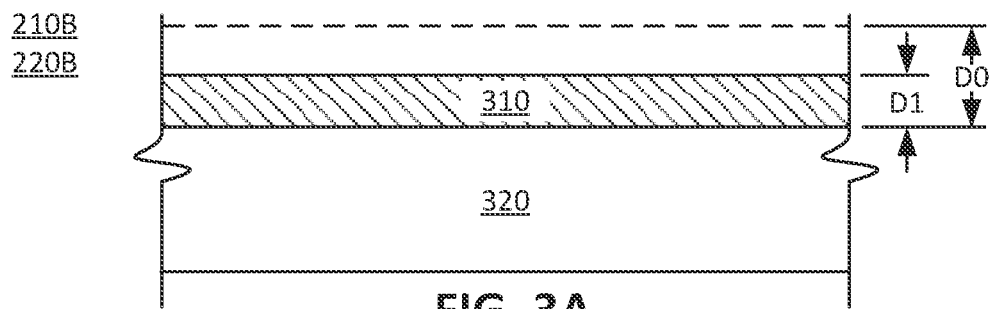
FIG. 3A illustrates a detailed view of an electrode, in accordance with various aspects of the subject technology.

Referring to FIG. 3A, an initial thickness D0 of the active layer 310 of the second battery cell 130 may be reduced to a thickness D1 in order to reduce the thru-plane impedance of the cathode layer 210B and/or anode layer 220B of the second battery cell 130 and to balance a C-rate of the second battery cell 130 with a C-rate of the first battery cell 120. To maintain the rated capacity of the second battery cell 130, however, electrode length or width may need to increase. This may cause an increase in in-plane impedance and may partially cancel out a reduction of thru-plane impedance. As one example, for a baseline thickness D0 of the active layer 310 of 50 μm for the cathode layer 210B and 60 μm for the anode layer 220B, reducing the thickness to D1 for both the cathode layer 210B and the anode layer 220B to about 25 μm will result in a reduction of thru-plane impedance of about 50%, but in-plane impedance may also increase—less so on a change of width and more on a change of length due to doubling of the total electrode area to maintain the same rated capacity. Other values and ranges for the reduced thickness D1 are contemplated and are within the scope of the subject technology.

In one aspect, the thickness D1 of the active layer 310 of the cathode layer 210B and/or anode layer 220B of the second battery cell 130 may be less than a thickness of the active layer 310 of the cathode layer 210A and/or anode layer 220A of the first battery cell 120. In another aspect, because the second battery cell 130 has a higher capacity or a greater length or width when compared to the first battery cell 120, reduction of the thickness of the active layer 310 (e.g., cathode layer 210B and/or anode layer 220B) of the second battery cell 130 reduces a thru-plane impedance of the second battery cell 130 in order to balance the C-rate of the second battery cell 130 with the C-rate of the first battery cell 120. As such, despite the second battery cell 130 having a higher capacity or QSI compared to the first battery cell 120, the QSI of the second battery cell 130 may be reduced compared to a conventional battery cell due to the reduced thickness of the active layer 310, thereby enabling splitting of a charging or discharging current in proportion to the respective capacities of the first battery cell 120 and the second battery cell 130.

For example, the first battery cell 120 may have a capacity of 1,000 mAh and an impedance of 200 milli-ohms, and the second battery cell 130 may have a capacity of 2,000 mAh and a reduced impedance of 100 milli-ohms due to the active layer 310 of the cathode layer 210B and/or anode layer 220B of the second battery cell 130 having a reduced thickness D1.

Figure 3B:
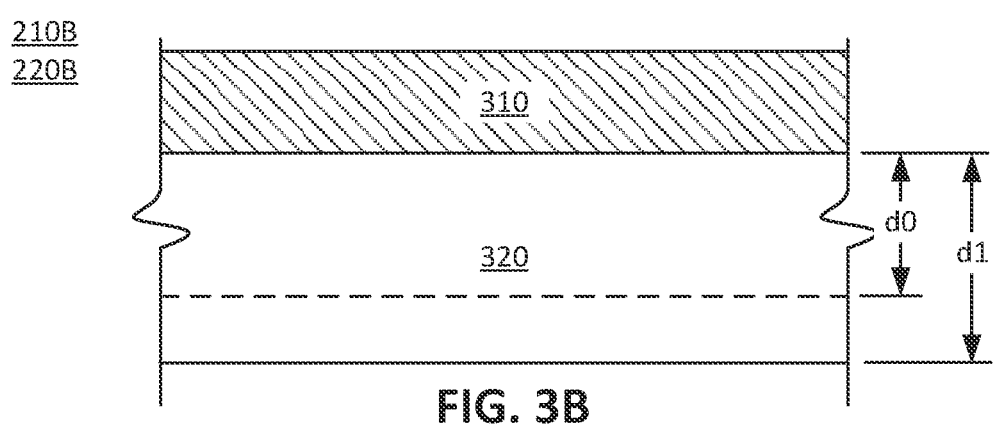
FIG. 3B illustrates a detailed view of an electrode, in accordance with various aspects of the subject technology.

Referring to FIG. 3B, an initial thickness d0 of the current collector 320 of the second battery cell 130 may be increased to a thickness d1 in order to reduce in-plane impedance of the cathode layer 210B and/or anode layer 220B of the second battery cell 130 and to balance a C-rate of the second battery cell 130 with a C-rate of the first battery cell 120. As one example, for a baseline thickness d0 of 10 μm for the current collector 320 of the cathode layer 210B and/or anode layer 220B of the second battery cell 130, an increased thickness d1 in a range of about 15 μm to 25 μm for the cathode layer 210B and/or anode layer 220B, results in reducing in-plane impedance by about 50%. In another example, the thickness d1 may be about 20 μm. Other values and ranges for the increased thickness d1 are contemplated and are within the scope of the subject technology.

In one aspect, the thickness d1 of the current collector 320 of the cathode layer 210B and/or anode layer 220B of the second battery cell 130 may be greater than a thickness of the current collector 320 of the cathode layer 210A and/or anode layer 220A of the first battery cell 120. In another aspect, because the second battery cell 130 has a higher capacity or a greater length or width when compared to the first battery cell 120, increase of the thickness of the current collector 320 (e.g., cathode layer 210B and/or anode layer 220B) of the second battery cell 130 reduces an impedance of the second battery cell 130 in order to balance the C-rate of the second battery cell 130 with the C-rate of the first battery cell 120. As such, despite the second battery cell 130 having a higher capacity compared to the first battery cell 120, the QSI of the second battery cell 130 may be reduced compared to a conventional battery cell due to the increased thickness of the current collector 320, thereby enabling splitting of a charging or discharging current in proportion to the respective capacities of the first battery cell 120 and the second battery cell 130.

For example, the first battery cell 120 may have a capacity of 1,000 mAh and an impedance of 200 milli-ohms, and the second battery cell 130 may have a capacity of 2,000 mAh and a reduced impedance of 100 milli-ohms due to the current collector 320 of the cathode layer 210B and/or anode layer 220B of the second battery cell 130 having an increased thickness d1.

It is also understood that the second battery cell 130 may have both a decreased thickness D1 of the active layer 310 and an increased thickness d1 of the current collector 320 in order to reduce an impedance of the cathode layer 210B and/or anode layer 220B of the second battery cell 130 and to balance a C-rate of the second battery cell 130 with a C-rate of the first battery cell 120.

Figure 3C:
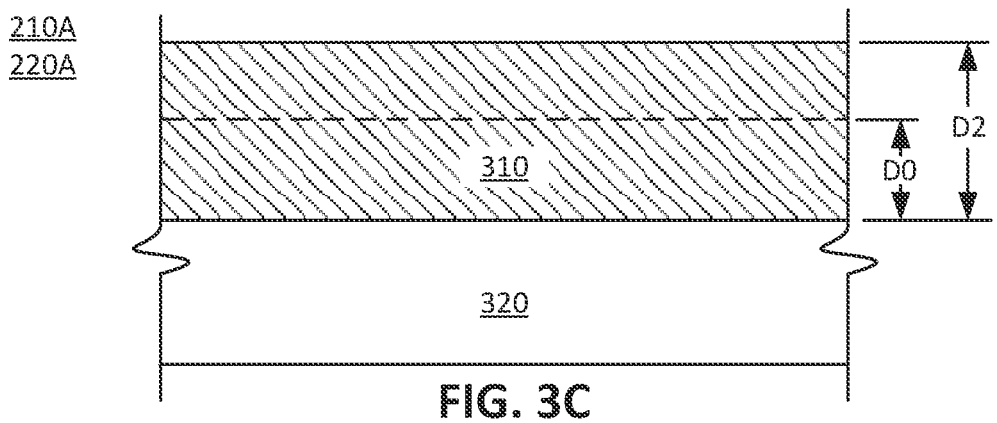
FIG. 3C illustrates a detailed view of an electrode, in accordance with various aspects of the subject technology.

Referring to FIG. 3C, an initial thickness D0 of the active layer 310 of the first battery cell 120 may be increased to a thickness D2 in order to increase the thru-plane impedance of the cathode layer 210A and/or anode layer 220A of the first battery cell 120 and to balance a C-rate of the first battery cell 120 with a C-rate of the second battery cell 130. To maintain the rated capacity of the first battery cell 120, however, electrode length or width may need to be reduced. This may cause a moderate decrease in in-plane impedance and may partially cancel out an increase in thru-plane impedance. In one example, for a baseline thickness D0 of the active layer 310 of 50 μm for the cathode layer 210A and 60 μm for the anode layer 220A, doubling the thickness to D2 for both the cathode layer 210A and the anode layer 220A will increase thru-plane impedance by about 100%, and in-plane impedance will decrease slightly due to reduced electrode length and/or electrode width to maintain the same rated capacity. In another example, the thickness D2 may be about 50 μm. Other values and ranges for the increased thickness D2 are contemplated and are within the scope of the subject technology.

In one aspect, the thickness D2 of the active layer 310 of the cathode layer 210A and/or anode layer 220A of the first battery cell 120 may be greater than a thickness of the active layer 310 of the cathode layer 210B and/or anode layer 220B of the second battery cell 130. In another aspect, because the first battery cell 120 has a lower capacity or a shorter length or width when compared to the second battery cell 130, increase of the thickness of the active layer 310 (e.g., cathode layer 210A and/or anode layer 220A) of the first battery cell 120 increases an impedance of the first battery cell 120 in order to balance the C-rate of the first battery cell 120 with the C-rate of the second battery cell 130. As such, despite the first battery cell 120 having a lower capacity (and normally a lower impedance) compared to the second battery cell 130, the impedance of the first battery cell 120 may be increased compared to a conventional battery cell due to the increased thickness of the active layer 310, thereby enabling splitting of a charging or discharging current in proportion to the respective capacities of the first battery cell 120 and the second battery cell 130.

For example, the first battery cell 120 may have a capacity of 1,000 mAh and an increased impedance of 400 milli-ohms due to the active layer 310 of the cathode layer 210A and/or anode layer 220A of the first battery cell 120 having an increased thickness D2, and the second battery cell 130 may have a capacity of 2,000 mAh and an impedance of 200 milli-ohms.

Figure 3D:
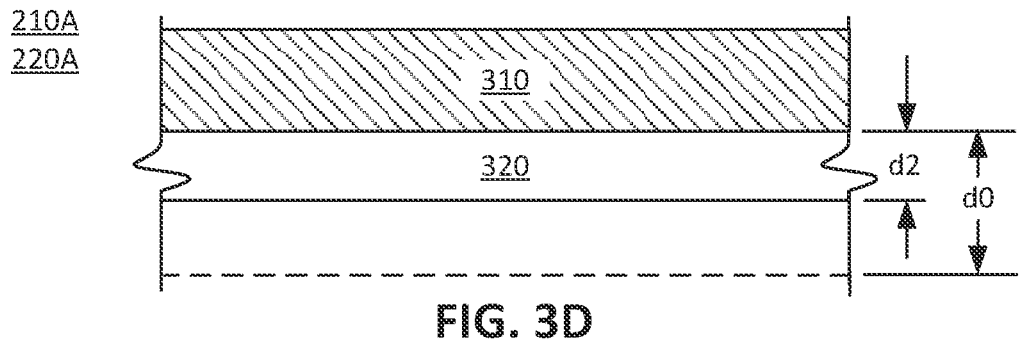
FIG. 3D illustrates a detailed view of an electrode, in accordance with various aspects of the subject technology.

Referring to FIG. 3D, an initial thickness d0 of the current collector 320 of the first battery cell 120 may be reduced to a thickness d2 in order to increase an in-plane impedance of the cathode layer 210A and/or anode layer 220A of the first battery cell 120 and to balance a C-rate of the first battery cell 120 with a C-rate of the second battery cell 130. As one example, for a baseline thickness d0 of 10 μm for the current collector 320 of the cathode layer 210A and/or anode layer 220A of the first battery cell 120, a reduced thickness d2 of about 5 μm for the cathode layer 210A and/or anode layer 220A, results in increasing in-plane impedance by about 100%. Other values and ranges for the reduced thickness d2 are contemplated and are within the scope of the subject technology.

In one aspect, the thickness d2 of the current collector 320 of the cathode layer 210A and/or anode layer 220A of the first battery cell 120 may be less than a thickness of the current collector 320 of the cathode layer 210B and/or anode layer 220B of the second battery cell 130. In another aspect, because the first battery cell 120 has a lower capacity or a shorter length or width when compared to the second battery cell 130, reduction of the thickness of the current collector 320 (e.g., cathode layer 210A and/or anode layer 220A) of the first battery cell 120 increases an impedance of the first battery cell 120 in order to balance the C-rate of the first battery cell 120 with the C-rate of the second battery cell 130. As such, despite the first battery cell 120 having a lower capacity (and normally a lower impedance) compared to the second battery cell 130, the QSI of the first battery cell 120 may be increased compared to a conventional battery cell due to the reduced thickness of the current collector 320, thereby enabling splitting of a charging or discharging current in proportion to the respective capacities of the first battery cell 120 and the second battery cell 130.

For example, the first battery cell 120 may have a capacity of 1,000 mAh and an increased impedance of 400 milli-ohms due to the current collector 320 of the cathode layer 210A and/or anode layer 220A of the first battery cell 120 having a reduced thickness d2, and the second battery cell 130 may have a capacity of 2,000 mAh and an impedance of 200 milli-ohms.

It is also understood that the first battery cell 120 may have both an increased thickness D2 of the active layer 310 and a decreased thickness d2 of the current collector 320 in order to increase an impedance of the cathode layer 210A and/or anode layer 220A of the first battery cell 120 and to balance a C-rate of the first battery cell 120 with a C-rate of the second battery cell 130.

Figure 4:
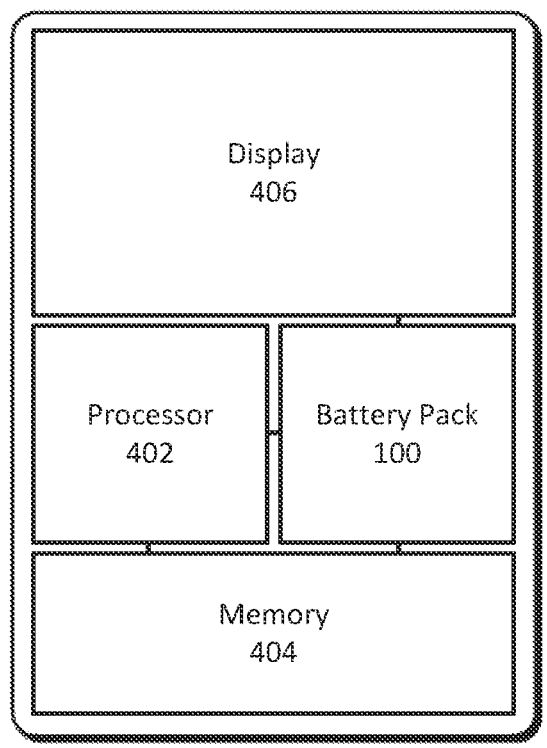
FIG. 4 illustrates a portable electronic device, in accordance with various aspects of the subject technology.

FIG. 4 illustrates a portable electronic device 400, in accordance with various aspects of the subject technology. The above-described rechargeable battery pack 100 can generally be used in any type of electronic device. For example, FIG. 4 illustrates a portable electronic device 400 which includes a processor 402, a memory 404 and a display 406, which are all powered by the battery pack 100. Portable electronic device 400 may correspond to a laptop computer, tablet computer, mobile phone, personal digital assistant (PDA), digital music player, watch, and wearable device, and/or other type of battery-powered electronic device. Battery pack 100 may correspond to a battery pack that includes one or more battery cells 120, 130. Each battery cell 120, 130 may include a set of layers, including a cathode 210A,B with an active layer 310 disposed on a current collector 320, a separator, an anode 220A,B with an active layer 310 disposed on a current collector 320, with the battery pack 100 utilizing C-Rate balancing as described above.

Figure 5:
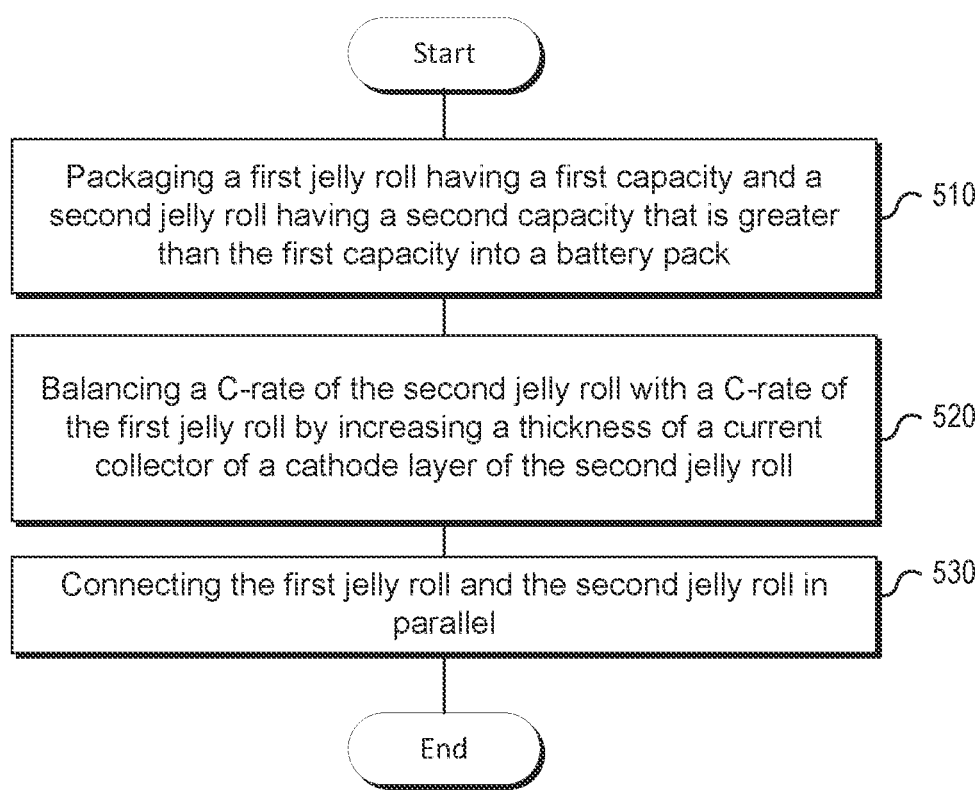
FIG. 5 illustrates an example method for balancing a C-rate of an asymmetric battery pack, in accordance with various aspects of the subject technology.

FIG. 5 illustrates an example method 500 for balancing a C-rate of an asymmetric battery pack, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 510, a first jelly roll having a first capacity and a second jelly roll having a second capacity that is greater than the first capacity are packaged into a battery pack. The first and second jelly rolls each comprise a cathode layer, an anode layer, and a separator layer disposed between the cathode layer and the anode layer. At operation 520, a C-rate of the second jelly roll is balanced with a C-rate of the first jelly roll by increasing a thickness of a current collector of the cathode layer of the second jelly roll to reduce an impedance of the second jelly roll. At operation 530, the first jelly roll and the second jelly roll are connected in parallel. In one aspect the method may further comprise increasing a thickness of a current collector of an anode layer of the second jelly roll to reduce an impedance of the second jelly roll. The method may also include reducing a thickness of an active layer of the cathode layer of the second jelly roll to reduce an impedance of the second jelly roll. The method may also include reducing a thickness of an active layer of an anode layer of the second jelly roll to reduce an impedance of the second jelly roll.

In another aspect, the method may include increasing a thickness of an active layer of the cathode layer of the first jelly roll to increase an impedance of the first jelly roll to balance a C-rate of the first jelly roll with a C-rate of the second jelly roll. The method may also include increasing a thickness of an active layer of the anode layer of the first jelly roll to increase an impedance of the first jelly roll to balance a C-rate of the first jelly roll with a C-rate of the second jelly roll. The method may further include decreasing a thickness of a current collector of the cathode layer of the first jelly roll to increase an impedance of the first jelly roll to balance a C-rate of the first jelly roll with a C-rate of the second jelly roll. The method may also include decreasing a thickness of a current collector of the anode layer of the first jelly roll to increase an impedance of the first jelly roll to balance a C-rate of the first jelly roll with a C-rate of the second jelly roll.

In another aspect, an example method for balancing a C-rate of jelly rolls of different impedances may include packaging a first jelly roll having a first impedance and a second jelly roll having a second impedance that is greater than the first impedance into a battery pack. The first and second jelly rolls each comprise a cathode layer, an anode layer, and a separator layer disposed between the cathode layer and the anode layer. A C-rate of the second jelly roll is balanced with a C-rate of the first jelly roll by increasing a thickness of a current collector of the cathode layer of the second jelly roll to reduce an impedance of the second jelly roll. The method may also include increasing a thickness of a current collector of an anode layer of the second jelly roll to reduce an impedance of the second jelly roll. The method may also include reducing a thickness of an active layer of the cathode layer of the second jelly roll to reduce an impedance of the second jelly roll. The method may also include reducing a thickness of an active layer of an anode layer of the second jelly roll to reduce an impedance of the second jelly roll.

Conversely, the method may also include increasing a thickness of an active layer of the cathode layer of the first jelly roll to increase an impedance of the first jelly roll to balance a C-rate of the first jelly roll with a C-rate of the second jelly roll. The method may also include increasing a thickness of an active layer of the anode layer of the first jelly roll to increase an impedance of the first jelly roll. The method may further include decreasing a thickness of a current collector of the cathode layer of the first jelly roll to increase an impedance of the first jelly roll. The method may also include decreasing a thickness of a current collector of the anode layer of the first jelly roll to increase an impedance of the first jelly roll.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for balancing a C-rate of an asymmetric battery pack, the method comprising:

packaging a first jelly roll battery cell and a second jelly roll battery cell into the asymmetric battery pack, first jelly roll battery cell comprising a first battery design and the second jelly roll battery cell comprising a second battery design, wherein the second battery design is different than the first battery design;

balancing a C-rate of the second jelly roll battery cell with a C-rate of the first jelly roll battery cell by increasing a thickness of a current collector of a cathode layer of the second jelly roll battery cell to reduce an impedance of the second jelly roll battery cell; and connecting the first jelly roll battery cell and the second jelly roll battery cell in parallel.

2. The method of claim 1, wherein an in-plane impedance of the current collector of the cathode layer of the second jelly roll battery cell is less than an in-plane impedance of a current collector of the first jelly roll battery cell.

3. The method of claim 1, further comprising increasing a thickness of a current collector of an anode layer of the second jelly roll battery cell.

4. The method of claim 3, wherein an in-plane impedance of the current collector of the anode layer of the second jelly roll battery cell is less than an in-plane impedance of a current collector of the first jelly roll battery cell.

5. The method of claim 1, further comprising reducing a thickness of an active layer of the cathode layer of the second jelly roll battery cell.

6. The method of claim 5, wherein a thru-plane impedance of the active layer of the cathode layer of the second jelly roll battery cell is less than a thru-plane impedance of an active layer of the first jelly roll battery cell.

7. The method of claim 1, further comprising reducing a thickness of an active layer of an anode layer of the second jelly roll battery cell.

8. The method of claim 7, wherein a thru-plane impedance of the active layer of the anode layer of the second jelly roll battery cell is less than a thru-plane impedance of an active layer of the first jelly roll battery cell.

9. The method of claim 1, wherein the first battery design of the first jelly roll battery cell further comprises a first capacity and the second battery design of the second jelly roll battery cell further comprises a second capacity that is greater than the first capacity.

10. The method of claim 1, wherein the first battery design of the first jelly roll battery cell further comprises a first capacity; and the second battery design of the second jelly roll battery cell further comprises a second capacity, wherein the second capacity is the same as the first capacity.

* * * * *